June 25, 1968   E. WEICHEL   3,389,821

FEEDING DEVICE FOR LOADING MACHINES

Filed Dec. 3, 1965   2 Sheets-Sheet 1

INVENTOR
ERNST WEICHEL
BY *M. Glew and Toren*
ATTORNEYS

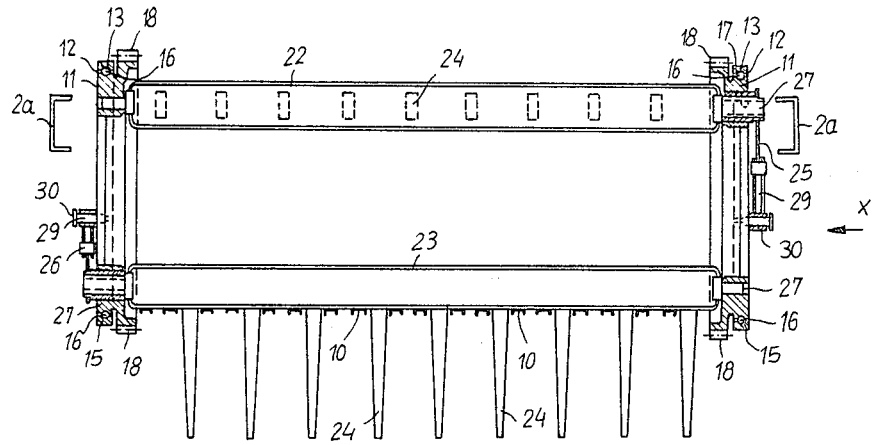
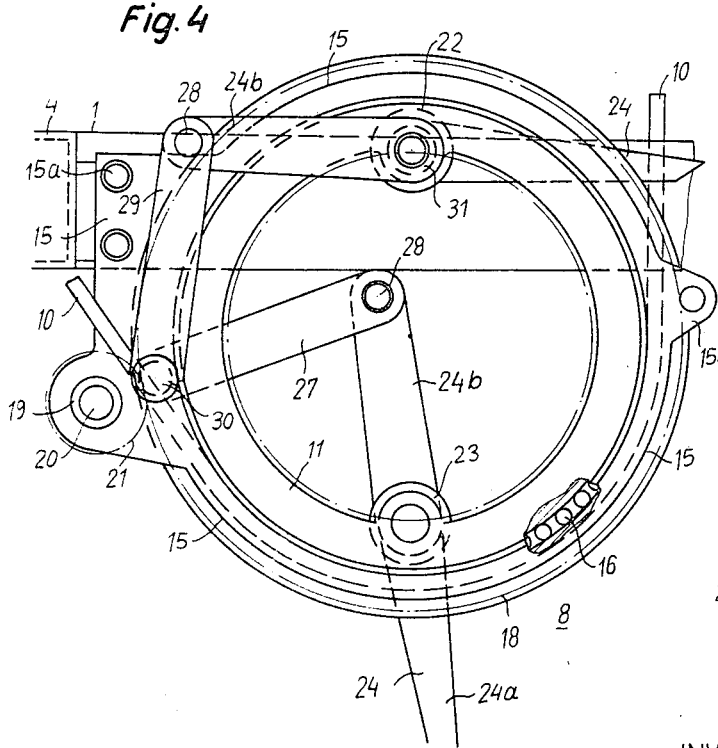
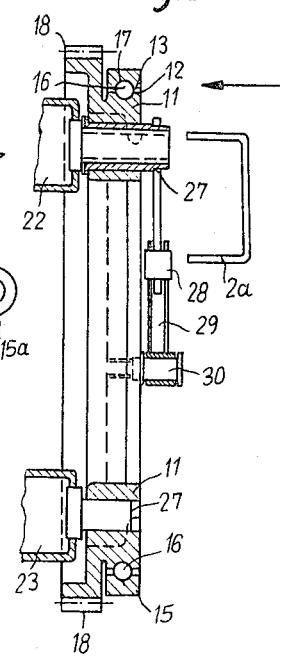

United States Patent Office 3,389,821
Patented June 25, 1968

3,389,821
FEEDING DEVICE FOR LOADING MACHINES
Ernst Weichel, Heiningen, Kreis Goppingen, Germany
Filed Dec. 3, 1965, Ser. No. 511,419
Claims priority, application Germany, Dec. 8, 1964,
W 38,101
9 Claims. (Cl. 214—83.3)

This invention relates, in general, to agricultural machinery and, in particular, to a new and useful truck loader having improved means for uniformly and evenly feeding material from the ground onto a loading truck.

The present invention is particularly applicable for use with a self-loading truck having a loading space, a receiving and feeding device and preferably a so-called "scraping bottom." The receiving and feeding device of these known self-loading trucks usually consists of means such as movable tines for directing the feed material from the ground through a feed channel which is arranged immediately after the feeding device. The various systems for operating such feeding devices are known. For example, so-called feed drums are provided which include a driven rigid drum spool mounted at each end and having attached to it rows or groups of feeding tines which are offset in a helical manner. The feeding tines are adapted to extend through slots in a grid and into a feed channel from one side. A disadvantage of the operation of such devices is that they usually require a curved feed tine and undesirable pressures or frictions are imparted to the conveyed material by the operation thereof so that the conveyed material may be damaged.

Another disadvantage of the known rigid feed tines is that due to their rearwardly bent form they grip the conveyed material in a less desirable manner directly before the feed channel than feed tines which are of straight form.

Further devices and arrangements include feeding means which provide feed drums with deflectable tines. While feed drums of this nature have a very good operating efficiency and a sufficiently long life, they have the disadvantage that the present extraction from the feed channel takes too long. In the operation thereof it is not possible to completely avoid a certain amount of pressing of the feed material when filling the truck and this is especially true when increasing the rate of feed of the material along the scraping bottom of the vehicle. Another disadvantage of the feed drums with deflectable tines is that they require relatively large free passage between the axis of the feed channel and the cross connection of the frame of the vehicle. This leads to a prolongation of the vehicle frame which is not desirable or to an undesirable increased dead space in the vehicle above the feed drum.

Feed chains have been used for feeding the material, but they have the disadvantages of high cost of construction and are subject to rapid wear. In addition, it is not possible to press the strong loading material, of low specific gravity, such as hay or straw, into the truck satisfactorily. Attempts have been made to use push rod tines which are mounted for articulation to effect the feeding of the material in the channel, but they have the disadvantage that heretofore there was a gap in the operating cycle of feeding so that between each revolution of the push rod heaps of fodder would form above the receiving device. An advantage of the mounting of the feed tine push rods so that they freely swing is that the control of the push rod feed tines is such that the tines always point downwardly during feeding, that is, that they swing only through an inward moving path once during each revolution. Such an arrangement, however, has heretofore been offset by the disadvantage that for structural reasons the arrangement of several tine rows is impossible.

In accordance with the present invention the disadvantages of the prior art devices are overcome while still retaining the advantage of a swinging feeding movement and gentle infeeding of the material. In accordance with the invention there is provided swinging tines which are articulated on rotatable limb elements so that they are swung through a feed path in association with the feed channel. The arrangement makes it possible to use two tine rows which are offset by approximately 180° from each other. A feature of the construction is that the tines are articulated so that they alternately come into engagement with the material to be fed during the revolution cycle. In order to achieve this, revolving bearing discs for the tine pivot member is mounted on a wheel element which is mounted for rotation on each side of the frame. The tines are connected to linkages which articulate them during the rotation of the disc members in a manner such that the ends move in a curve parallel to the feeding channel and then backwardly and downwardly in a gentle feeding movement. The tines of one tine row are effective to engage the material and direct it into the feeding channel at the time the tines of the other diametrically opposite row are moved backwardly from the feeding channel in a return movement.

Accordingly, it is an object of the invention to provide improved means for feeding material upwardly along a feeding channel which includes separate rotatable bearings for two tine supporting tubes or rows for rotatably mounting the tubes in an annular member which, in turn, is rotated, and to a linkage connected to the tines of the rows for effecting the pivotal movement of the tines in a manner such that the outer ends thereof move in an arc substantially parallel to the feeding channel and to cooperate such that one tine is effective for feeding while the other tine is moved backwardly in a return movement.

A further object of the invention is to provide an improved loading device particularly for self-loading trucks which includes means for gently feeding the material uniformly and constantly upwardly along a feeding channel.

A further object of the invention is to provide a device for feeding material onto a truck or the like which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 3 is a transverse sectional view of the loading device;

FIG. 4 is an enlarged view, similar to FIG. 1 of the loading device operating mechanism; and FIG. 5 is an enlarged partial sectional view similar to FIG. 3 of one tine bearing mounting ring.

Figure 1:
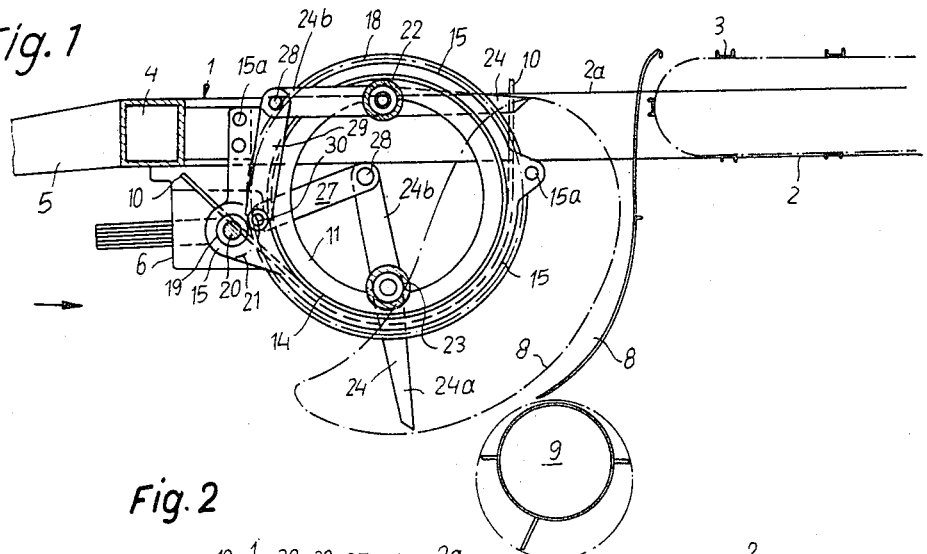
FIG. 1 is a sectional view taken along the line 1—1 of FIG. 2 of a loading truck constructed in accordance with the invention.

Referring to the drawings in particular, the invention embodied therein includes a loading truck generally designated 1 having spaced longitudinal frame members 2, 2 and an end frame member 4. At a spaced location from the front frame 4, there is mounted a rotatable sprocket element 3 which drives an endless chain conveyor scraper 3'. At the forward end of the frame 4 there is secured a tractor device 5 which is partially indicated. The drive for the operating mechanism is from a shaft 5a of the tractor through a transmission or gear box 6. The gear box 6 is supported between the sides 2, 2 in a manner leaving a wide space 7 between the frame 4 and the scraper bottom 3'. In the space 7 is arranged a feeding device which includes a feed channel 8 extending downwardly in a curve from a top reach of the scraper 3' to a receiving drum 9 which is rotatably mounted adjacent the bottom edge of the channel 8.

In accordance with the invention the feeding mechanism includes a rotatably mounted annular tine bearing support 11 adjacent each side frame 2 which is supported for rotation on ball bearings 12 on outer races 13 carried by bearing plates 15 which are secured to the respective side members 2 by means of securing bolts 15a (see FIGS. 4 and 5). The balls 12 retain the annular bearing members 11 against lateral movement so that they can rotate only on the periphery of the bearing plates 15. As indicated best in FIG. 5, the outer periphery of the annular bearing members 11 are provided with a laterally projecting toothed ring or gear 18 which engages with the teeth of a driving pinion 21 which is carried on a drive shaft 20. The shaft 20 is mounted in the transmission 6 and in bores 19 of the bearing plate 15. Rotation of the shaft 5a thus produces rotation of each portion of the shaft 20 through gears 6a and rotation of the annular tine bearing support member 11 through the gears 21.

Figure 2:
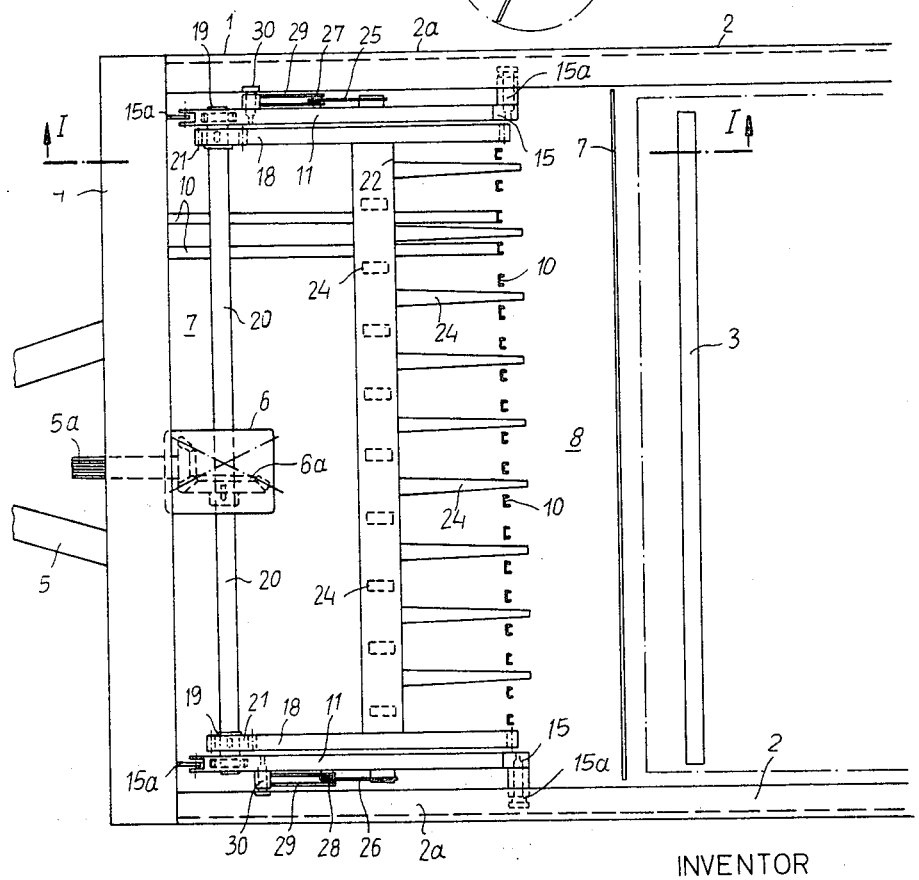
FIG. 2 is a partial top plan view of the loading truck.

A feature of the invention is that two tine sets are provided, each of which includes a rotatable shaft or hub portion or tube 22 and 23, respectively. Each tube 22 and 23 turns a plurality of feed tine elements 24 at spaced locations along the length thereof. The outer ends 24a of the tines 24 are somewhat pointed, as indicated and the inner ends 24b are pivoted at 28 to a control arm 27 or 29. The opposite ends of the control arms 27 and 29 are articulated to a control bearing pin 30. (For clarity of illustration purposes, the portions 24b of each tine and the connecting link 27 and 29 are shown in a drawn out condition in FIGS. 2, 3 and 5.)

During rotation of the bearing brackets 11 in a counterclockwise direction the tine tube 23 is moved to the position indicated in FIG. 1 and held by the control link 27 and the extension portion 24b of the tines so that the tip of the tine 24 describes the path shown in dot-dash lines. The path is preferably in a kidney shaped form. That part of the path of the tip of the tine 24 which is within the feed channel 8 represents the actual feed path and the part of the path which is above the stripping grid 10 represents the return path. As indicated, the stripping grid 10 includes spaced grid elements between which the tines are moved in a substantially horizontal position for the purpose of stripping the material therefrom when the tine is moved on a return stroke.

As can be seen from FIG. 1, the path of feed movement is largely identical with the course of the known feed channel 8. This permits a good conveyance of the material almost to the upper end of the feed channel. Because in accordance with the invention the bearing ring members 11 are guided circumferentially for rotation in the bearing plates 15, there is no requirement for a central bearing channel or for a laterally protruding concentrically arranged bearing housing. This makes it possible to arrange the respective control link elements 27 and 29 and the connecting parts of the tine 24b outside the annular bearing member 11, or the bearing plate 15. It is also possible to locate these connecting linkages on sides different from the feeding part 24a of the tines so that the controlling linkages will not interfere with the feeding operation.

Because the linkages are not required between the bearing brackets 15 or the annular bearing support members, it is possible to install in accordance with the invention two tine tubes, tube 22 and tube 23. In accordance with a feature of the invention the tubes are offset preferably by 180° and the control elements or linkages for them are advantageously located on one side for one tube and on an opposite side of the frame for the other tube. This arrangement is necessary so that the links will not hinder the operation of the other links as they are revolved.

As indicated best in FIG. 1, the mechanism operates so that the tines are moved into contact with the conveyed material which is pushed beyond the receiving drum 9 as the receiving drum rakes after movement thereof. The tines effect an even pushing of the material into the feed channel and the tines are extracted by movement through the scraping grid 10 at the end of the feed path. The movement of the tines during retraction and scraping is substantially horizontal. Because the upper rake is extracted from the feed channel directly after the lower rake is positioned to move the material there is an even conveyance of the material along the feed channel to the scraping bottom without interruption. In this manner, it is possible to work at relatively low speeds of revolution of the feed organ and this provides for a very gentle treatment of the conveyed material without impairing the efficiency of the vehicle, that is, by lowering the driving speed, for example, or by reducing the speed of rotation of the device. Thus, the advantage of a very gentle treatment of the fodder is combined with the advantage of an almost continuous conveyance of the material while maintaining the advantages of high output with respect to driving speed and the advantage of a simple sturdy construction. Thus impacts on the tractor or on the conveyed material which would occur by feed swings of the operation of the vehicle due to jerky conveyance as was the case prior to the present invention are eliminated.

The annular bearing members 11, by way of example of construction, have been indicated to be in the form of rings so that they will save weight and so that they will not have to be fitted at their centers. This annular form, however, can be replaced by a plate or disc member or by a spoked member. The distance of the bearings for the tine tubes 22 and 24 or the diameter of the annular bearing member must be greater than double the length of the tines 24 so that the tines cannot strike against the top of the central tube with their tips during operation. With such a construction it is possible to provide for a drive of the feed mechanism on only one side and thus achieve a saving in construction cost and weight.

While a specific embodiment of the invention has been shown and described in detail to illustrate the application of the inventive principles, it will be understood that the invention may be embodied otherwise without departing from such principles.

What is claimed is:

1. A feeding device for loading machines and the like comprising a frame, a feed guide channel on said frame, first and second tine supporting elements each carrying a plurality of laterally spaced tines thereon, each of said tines including an inner end and an outwardly projecting portion, means on said frame for supporting said tine supporting elements adjacent said inner end thereof for revolving movement of said outwardly projecting portion adjacent said guide channel and for individual pivotal movement about their inner ends on respective axis at substantially diametrically opposite locations of the path of revolution, a first link having a first end connected to said supporting means and a second end extending outwardly from said supporting means and a second link having one end pivotally connected to said frame and an opposite end connected to said second end of said first link to pivot said supporting means and said tine supporting elements to confine the movement of the outwardly projecting portions of the tines to a path corresponding to the feed channel during an upward feeding movement of said tine supporting elements with said tines.

2. A feeding device according to claim 1, wherein said first and second supporting elements are annular members.

3. A feeding device according to claim 1, including a support bracket for attaching said feeding device to each side of a loading truck, and an annular member rotatable in each of said support brackets comprising said support element.

4. A feeding device for loading machines and the like comprising a feed guide channel, first and second tine supporting elements each carrying a plurality of laterally spaced tines thereon, each of said tines including an outwardly projecting portion, means for supporting said tine supporting elements for revolving movement adjacent said guide channel and for individual pivotal movement about their inner ends at substantially diametrically opposite locations of the path of revolution, and linkage means connected to said tine supporting elements to confine the movement of the outwardly projecting portions of the tines to a path corresponding to the feed channel during an upward feeding movement of said tine supporting elements with said tines, a support bracket for attaching said feeding device to each side of a loading truck, an annular member rotatable in each of said support brackets comprising said support element, said linkage means including rearwardly projecting portion of said tine, and a control arm having one end pivotally connected to said rearwardly projecting portion of at least one of said tines of each of said supporting elements and having an opposite outer end pivotally held at a fixed location.

5. A feeding device according to claim 4, wherein said arms which are pivotally connected to said tines of respective supporting elements are pivotally connected at the same fixed location for each of said tine supporting elements.

6. A feeding device according to claim 4, including a loading truck frame, a scraper bottom located on said frame adjacent the rear portion thereof, said guide channel extending downwardly from said frame ahead of said scraper bottom, said means supporting said tines including means mounted on each side of said frame.

7. A feeding device according to claim 6, including a mounting bracket for said supporting means and an annular member rotatably mounted in said mounting bracket rotatably supporting first and second tine supporting elements at diametrically opposite locations thereon.

8. A feeding device according to claim 7, wherein said annular member and said mounting bracket are separated by ball bearings which confine said annular member against lateral movement.

9. A feeding device according to claim 7, wherein said annular member includes a gear run, and a driving gear engaged with said gear run to rotate said annular member.

References Cited

UNITED STATES PATENTS

| | | | |
|---|---|---|---|
| 1,346,433 | 7/1920 | Varland. | |
| 1,945,340 | 1/1934 | Arentzen | 198—10 |
| 2,144,905 | 1/1939 | Wallace | 56—226 |
| 2,392,697 | 1/1946 | Russell et al. | 198—10 |
| 2,654,984 | 10/1953 | Fiess | 56—226 |
| 3,279,589 | 10/1966 | Krahn et al. | 198—9 |

GERALD M. FORLENZA, *Primary Examiner.*

ALBERT J. MAKAY, *Examiner.*